United States Patent
Connell, II et al.

(10) Patent No.: US 10,630,909 B2
(45) Date of Patent: Apr. 21, 2020

(54) CAMERA APPARATUS AND SYSTEM, METHOD AND RECORDING MEDIUM FOR INDICATING CAMERA FIELD OF VIEW

(71) Applicant: International Business Machines Corporation, Armonk, NY (US)

(72) Inventors: Jonathan Hudson Connell, II, Cortlandt-Manor, NY (US); Sharathchandra Umapathirao Pankanti, Darien, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/040,616

(22) Filed: Jul. 20, 2018

(65) Prior Publication Data

US 2018/0338101 A1 Nov. 22, 2018

Related U.S. Application Data

(63) Continuation of application No. 15/224,387, filed on Jul. 29, 2016, now Pat. No. 10,084,979.

(51) Int. Cl.
| | |
|---|---|
| *H04N 5/225* | (2006.01) |
| *H04N 5/235* | (2006.01) |
| *H04N 5/74* | (2006.01) |
| *G02B 27/01* | (2006.01) |
| *H04N 9/12* | (2006.01) |
| *G01S 17/36* | (2006.01) |

(52) U.S. Cl.
CPC ......... *H04N 5/2354* (2013.01); *H04N 5/2256* (2013.01); *H04N 5/2351* (2013.01)

(58) Field of Classification Search
None
See application file for complete search history.

(56) References Cited

U.S. PATENT DOCUMENTS

| | | | |
|---|---|---|---|
| 10,084,974 B2 * | 9/2018 | Ovsiannikov | H04N 5/33 |
| 10,142,553 B2 | 11/2018 | Horesh | |
| 2007/0019099 A1 * | 1/2007 | Lieberman | G02B 13/16 348/335 |
| 2007/0019103 A1 | 1/2007 | Lieberman et al. | |
| 2008/0174691 A1 | 7/2008 | Polidor | |

(Continued)

OTHER PUBLICATIONS

United States Notice of Allowance dated May 14, 2018 in U.S. Appl. No. 15/224,387.

(Continued)

*Primary Examiner* — Reza Aghevli
(74) *Attorney, Agent, or Firm* — Anthony Curro, Esq.; McGinn IP Law Group, PLLC

(57) ABSTRACT

A camera field indicating method, system, and non-transitory computer readable medium for a camera including imaging optics, a light sensor, the imaging optics and the light sensor intermittently sensing incoming light, an extended light source provided separate from the imaging optics and the light sensor, the extended light source comprising a distributed illuminator capable of being intermittently activated when the light sensor does not need to sense incoming light such that a projection of the distributed illuminator through a duplicate lens of the extended light source matches a field of view of the light sensor.

9 Claims, 6 Drawing Sheets

(56) References Cited

U.S. PATENT DOCUMENTS

| | | |
|---|---|---|
| 2008/0297614 A1 | 12/2008 | Lieberman et al. |
| 2009/0190015 A1* | 7/2009 | Bechtel ............... H04N 5/2355 |
| | | 348/302 |
| 2009/0256938 A1 | 10/2009 | Bechtel et al. |
| 2011/0019073 A1 | 1/2011 | Naimark |
| 2011/0211056 A1 | 9/2011 | Publicover et al. |
| 2012/0092461 A1* | 4/2012 | Fisker .................. A61B 5/0068 |
| | | 348/46 |
| 2013/0141554 A1* | 6/2013 | Ganick .................... G01S 1/70 |
| | | 348/61 |
| 2013/0300637 A1 | 11/2013 | Smits et al. |
| 2014/0086590 A1* | 3/2014 | Ganick ................. G06Q 30/02 |
| | | 398/118 |
| 2014/0313776 A1 | 10/2014 | Grigore |
| 2015/0097719 A1 | 4/2015 | Balachandreswaran et al. |
| 2015/0253428 A1* | 9/2015 | Holz ...................... G01S 17/42 |
| | | 356/5.01 |
| 2015/0334808 A1 | 11/2015 | Hack et al. |
| 2015/0374210 A1* | 12/2015 | Durr ..................... A61B 1/041 |
| | | 600/111 |
| 2016/0072584 A1* | 3/2016 | Ganick ............... H04N 5/2256 |
| | | 398/118 |
| 2016/0187199 A1* | 6/2016 | Brunk ................... G01J 3/2823 |
| | | 348/89 |
| 2017/0104939 A1 | 4/2017 | Sun |

OTHER PUBLICATIONS

United States Office Action dated Jan. 18, 2018 in U.S. Appl. No. 15/224,387.

Mel, et al. "The NIST Definition of Cloud Computing". Recommendations of the National Institute of Standards and Technology. Nov. 16, 2015.

\* cited by examiner

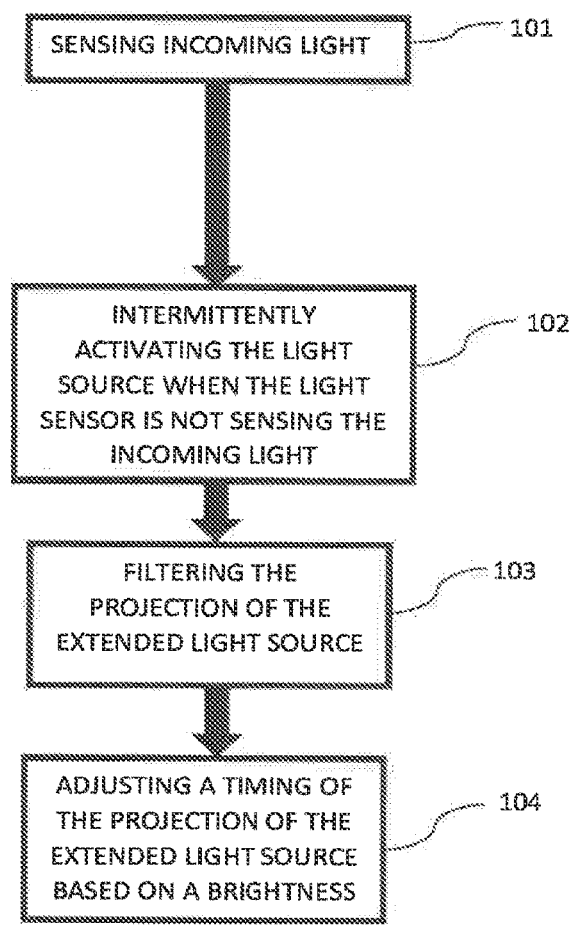

FIG. 3
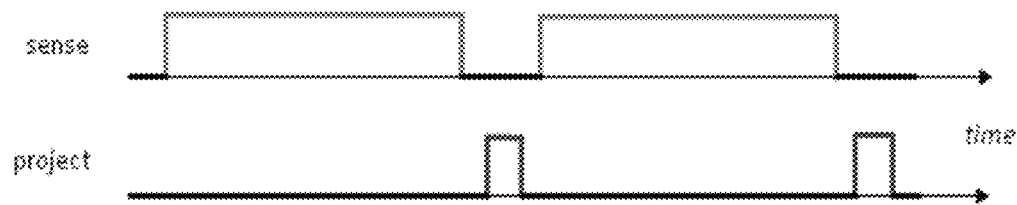
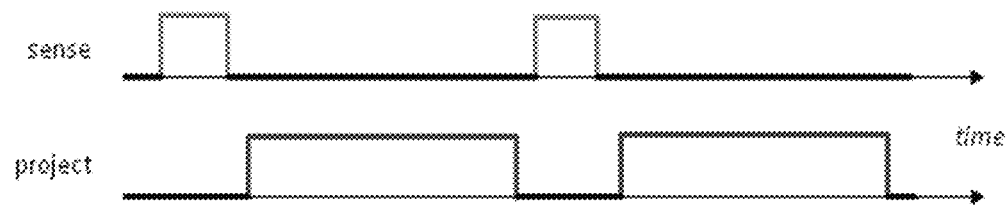
FIG. 4
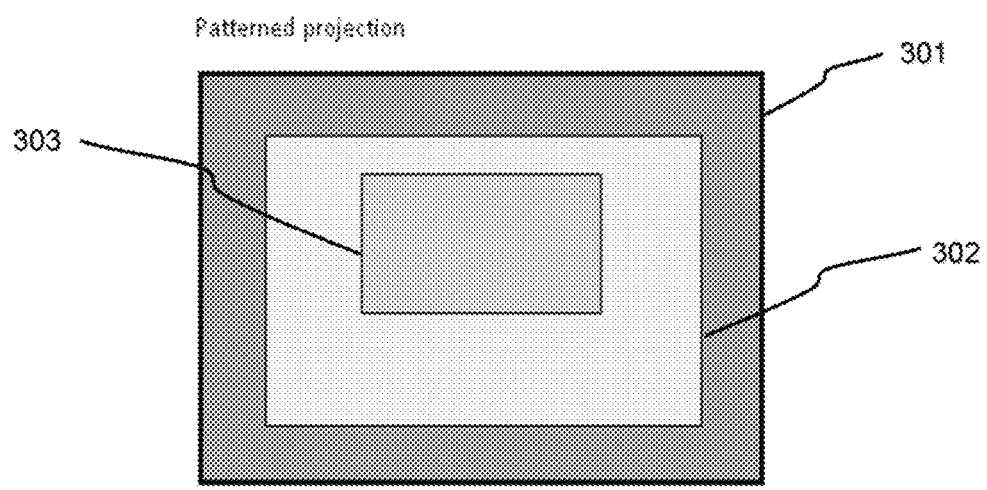

CAMERA APPARATUS AND SYSTEM, METHOD AND RECORDING MEDIUM FOR INDICATING CAMERA FIELD OF VIEW

CROSS-REFERENCE TO RELATED APPLICATIONS

The present application is a Continuation Application of U.S. patent application Ser. No. 15/224,387, filed on Jul. 29, 2016, the entire contents of which are hereby incorporated by reference.

BACKGROUND

The present invention relates generally to a camera field indicating method, and more particularly, but not by way of limitation, to a system, method, and recording medium for allowing the user to determine if the user is within the camera field of view despite large offsets from the imaging device.

The growing trend of a user taking so-called "selfies" (e.g., a picture of themselves or a group of users that is taken by the user) has led to inaccuracies in taking the selfies because the user must use the camera without being able necessarily to determine the field of view of the camera. This is because conventional cameras include a viewing screen (e.g., such as a smartphone including a camera or a digital camera device) to look at the field of view on an opposite side of the imaging device such that when a user attempts to take their own picture, they adequately or accurately cannot view the screen to determine if the camera is capturing the intended users. Also, from a business point of view, there is not currently an efficient way for notifying people when they are under direct video surveillance (e.g., the camera could be indicated as on but the user in unable to determine if they are directly being surveilled).

Thus, the needs in the art include that a user is unable to determine adequately or accurately a field of view of the camera when taking, for example, a selfie because the user is not able to adjust the positioning of the camera to capture the correct image because the user cannot view the screen that displays the image to be captured (e.g., cannot determine the field of view of the camera). Also, the needs in the art include a way to notify a user when the user is under video surveillance.

SUMMARY

In an exemplary embodiment, the present invention can provide a camera field indicating method for a camera including a light sensor, imaging optics, and an extended light source situated near the light sensor and sharing the imaging optics, the method including sensing incoming light via the imaging optics and the light sensor and intermittently activating the extended light source when the light sensor does not need to sense incoming light such that a projection of the extended light source through the imaging optics matches a field of view of the light sensor.

Further, in another exemplary embodiment, the present invention can provide a camera field indicating system for a camera including a light sensor, imaging optics, and an extended light source situated near the light sensor and sharing the imaging optics, said system including a processor, and a memory, the memory storing instructions to cause the processor to: sense incoming light via the imaging optics and the light sensor, and intermittently activate the extended light source when the light sensor does not need to sense incoming light such that a projection of the extended light source through the imaging optics matches a field of view of the light sensor.

Even further, in another exemplary embodiment, the present invention can provide a camera including imaging optics, a light sensor, the imaging optics and the light sensor intermittently sensing incoming light, an extended light source disposed near the light sensor and sharing the imaging optics with the light sensor, and the light source is intermittently activated via a signal when the light sensor does not need to sense incoming light such that a projection of the extended light source through the imaging optics matches a field of view of the light source.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 1 exemplarily shows a high-level flow chart for a camera field indicating method 100.

FIG. 3 exemplarily shows adjusting a timing of the projection of the extended light source based on a brightness of the environment according to Step 105.

FIG. 4 exemplarily shows a patterned projection using an optical filter of the camera.

DETAILED DESCRIPTION

Figure 2A:
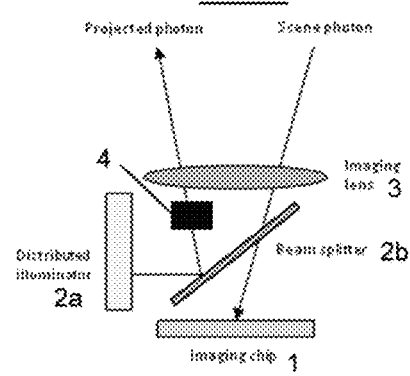
FIG. 2A exemplarily shows a first exemplary embodiment of a camera.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the camera field indicating method 100 includes various steps to allow the user to determine if the user is within the camera field of view despite large offsets from the imaging device or a screen of the imaging device not being viewable. As shown in at least FIG. 6, one or more computers of a computer system 12 can include a memory 28 having instructions stored in a storage system to perform the steps of FIG. 1.

Figure 5:
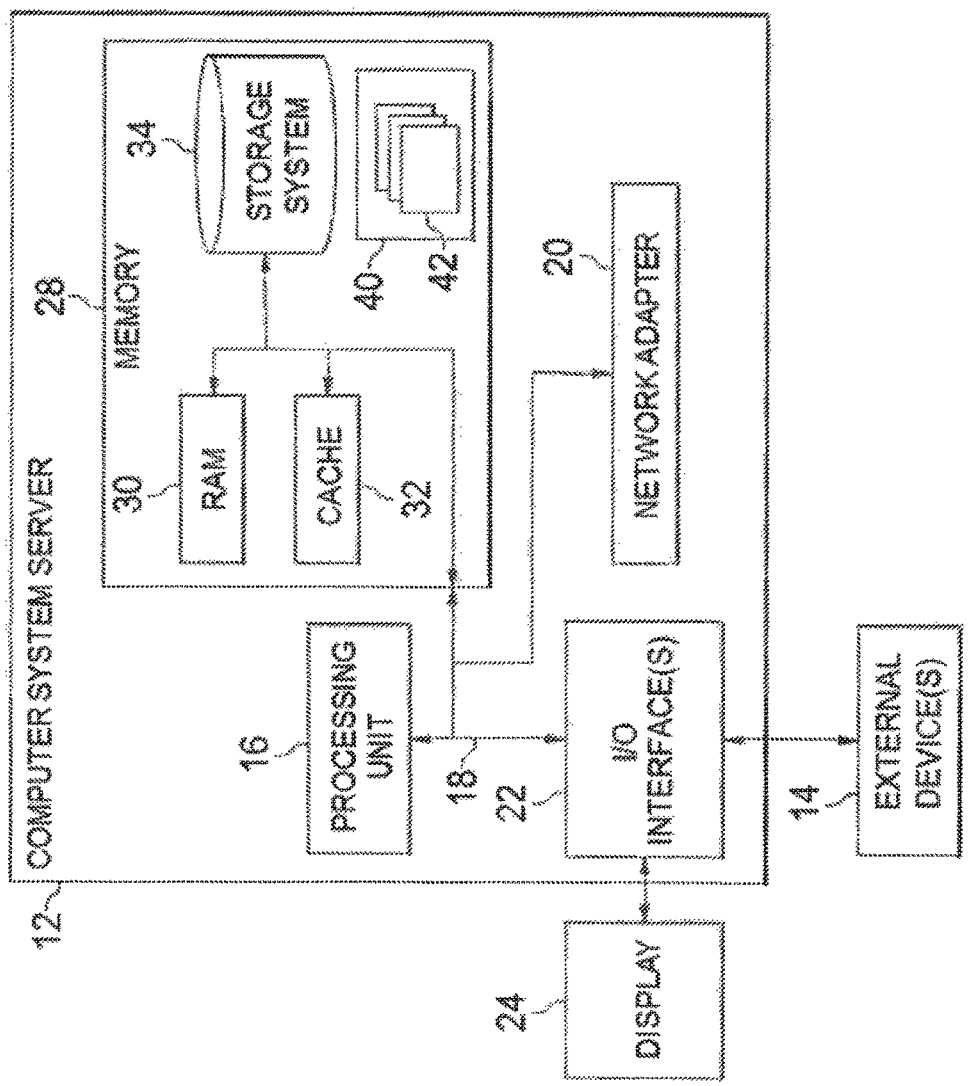
FIG. 5 depicts a cloud-computing node according to an embodiment of the present invention.
Figure 6:
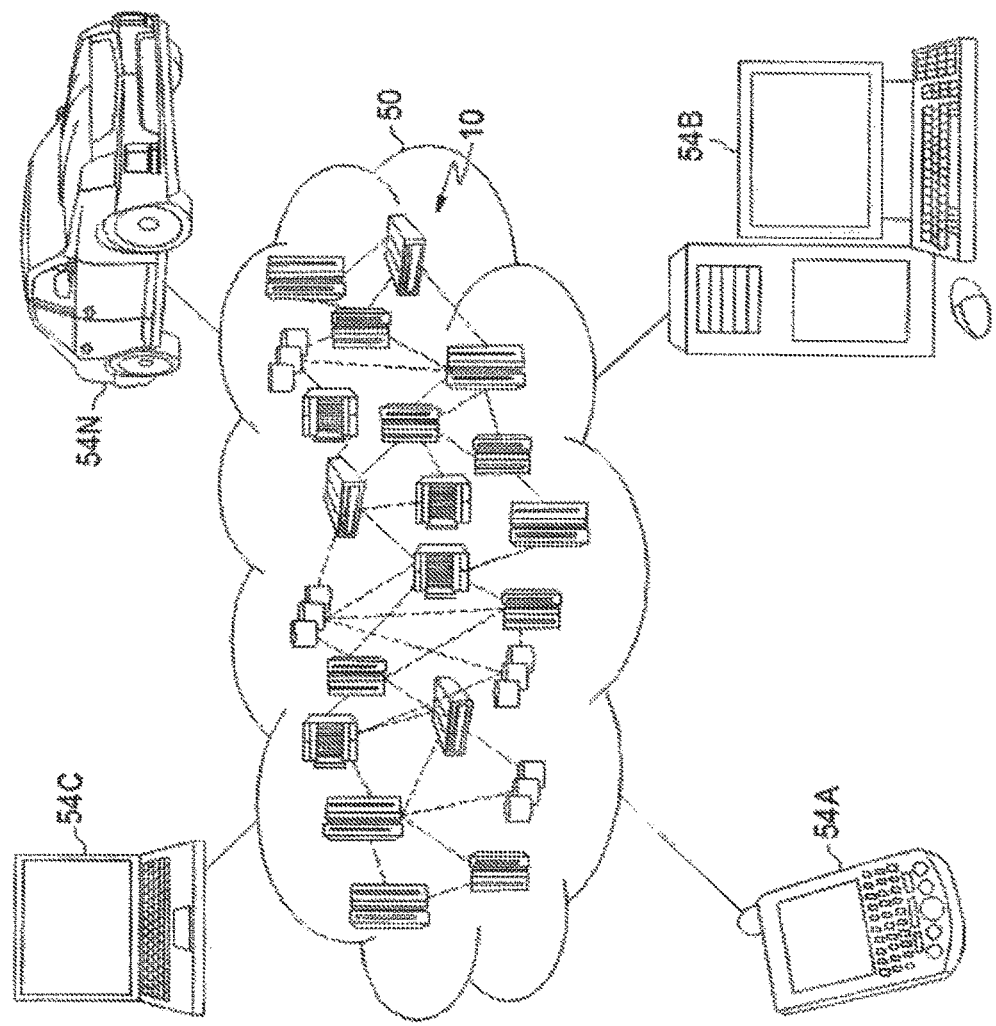
FIG. 6 depicts a cloud-computing environment according to another embodiment of the present invention.
Figure 7:
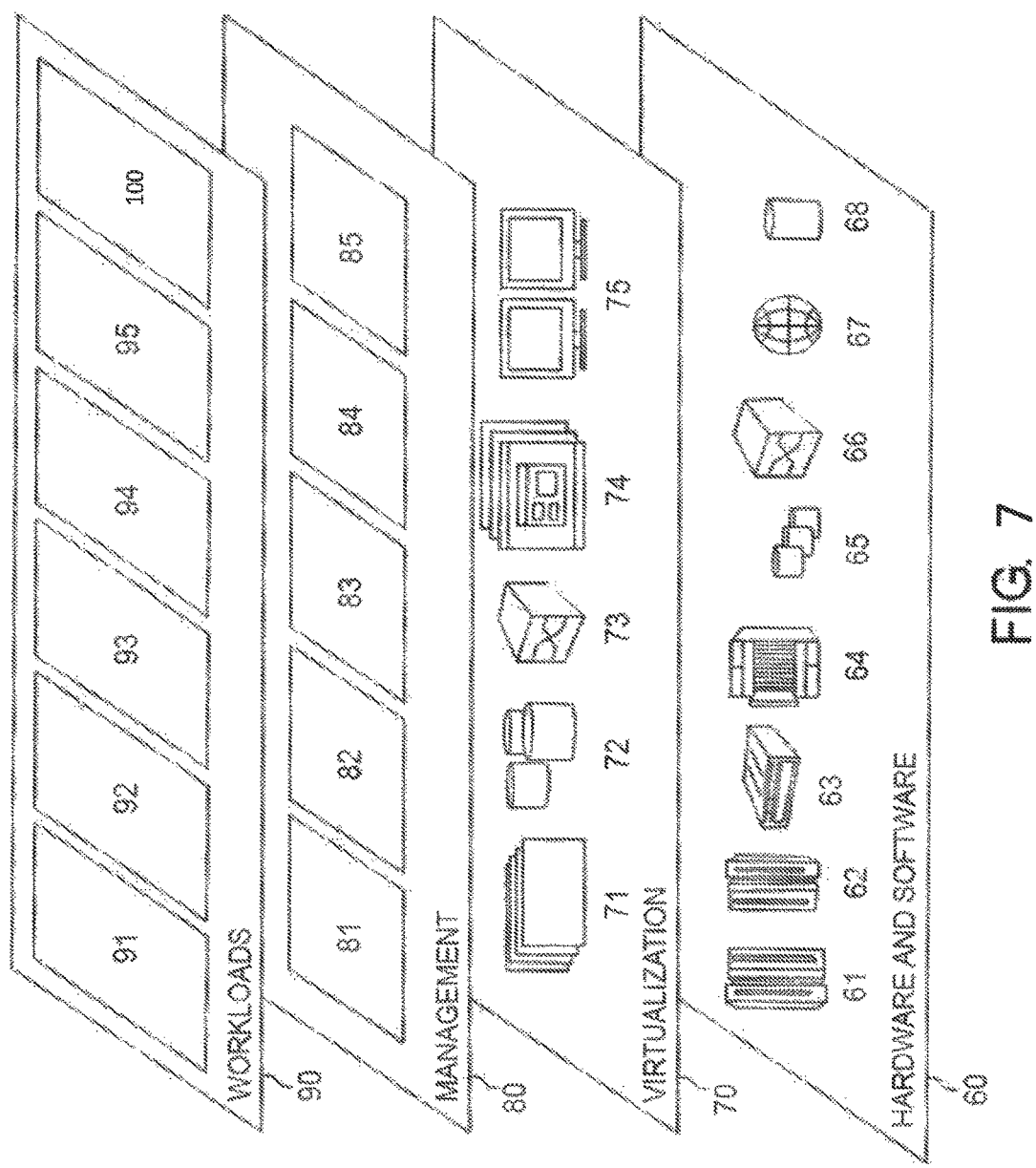
FIG. 7 depicts abstraction model layers according to an embodiment of the present invention.

Although as shown in FIGS. 5-7 and as described later, the computer system/server 12 is exemplarily shown as one or tore cloud computing nodes 10 of the cloud environment 50 as a general-purpose computing circuit which may execute in a layer the camera field indicating system method (FIG. 6), it is noted that the present invention can be implemented outside of the cloud environment.

FIGS. 2A-2D each depict exemplary configurations of a camera. Each of the exemplary camera configurations includes an imaging chip 1 (a light sensor), an extended light source 2, an imaging lens 3 (imaging optics), and an optical filter 4. The light source can be intermittently activated by, for example, a button, a signal, etc. It is noted that the extended light source 2 can generate near monochromatic light. That is, the extended light source 2 could be composed of a number of red, yellow, and green LEDs. These do not emit white light that needs to be spectrally filter and instead they are intrinsically one color. Thereby, the extended light source 2 can act as the optical filter 4 (as described later). Further, the extended light source can be spatially patterned.

As shown in FIG. 2A, the camera includes an imaging lens 3 and an imaging chip 1 that intermittently senses incoming light. The camera further includes an extended light source configured by a distributed illuminator 2a and a beam splitter 2b which is situated near the imaging chip 1 so as to share the imaging lens 3 with the imaging chip 1. The extended light source 2 is capable of being intermittently activated when imaging chip 1 does not need to sense incoming light (e.g., the pixels in the imager have collected enough light for a current frame) of the distributed illuminator 2a and the beam splitter 2b through the an imaging lens 3 matches the field of view of the imaging chip 1. The distributed illuminator 2a (e.g., the extended light source) is projected by the imaging optics through the user of the beam splitter 2b.

Figure 2B:
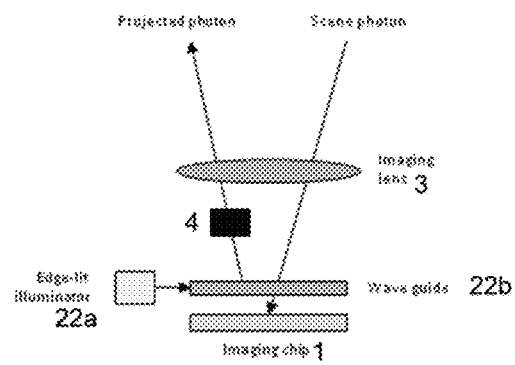
FIG. 2B exemplarily shows a second exemplary embodiment of the camera.

As shown in FIG. 2B, the camera includes an imaging lens 3 and an imaging chip 1 that intermittently senses incoming light. The camera further includes an edge-lit illuminator comprising a light source 22a and a leaky waveguide 22b situated near the imaging chip 1 so as to share the imaging lens 3 with the imaging chip 1. The edge-lit illuminator 2 is capable of being intermittently activated when imaging chip 1 does not need to sense incoming light (e.g., the pixels in the imager have collected enough light for a current frame) such that the projection of the light source 22a and the leaky waveguide 22b through the imaging lens 3 matches the field of view of the imaging chip 1. The extended light source comprises the leaky waveguide 22b positioned parallel to the light sensor (not referenced in FIG. 2B).

Figure 2C:
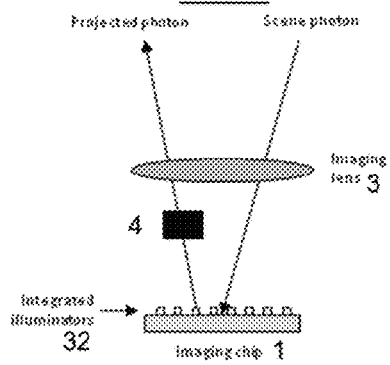
FIG. 2C exemplarily shows a third exemplary embodiment of the camera.

As shown in FIG. 2C, the camera includes an imaging lens 3 and an imaging chip 1 that intermittently senses incoming light. The imaging chip 1 includes integrated illuminators 32 (e.g., integrated with the imaging chip 1) so as to share the imaging lens 3 with the imaging chip 1. The integrated illuminators 32 are capable of being intermittently activated when imaging chip 1 does not need to sense incoming light (e.g., the pixels in the imager have collected enough light for a current frame) such that the projection of the integrated illuminators 32 through the imaging lens 3 matches the field of view of the imaging chip 1. That is, the illuminators 32 are integrally disposed at predetermined intervals on the imaging chip 1.

Figure 2D:
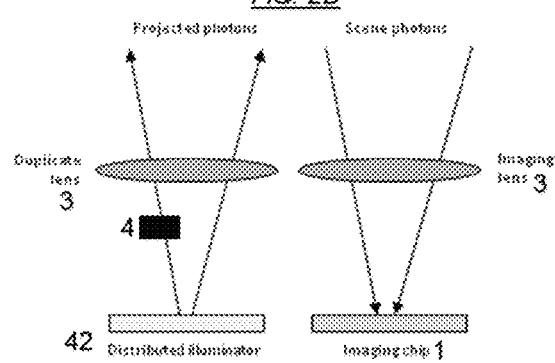
FIG. 2D exemplarily shows a fourth exemplary embodiment of the camera.

As shown in FIG. 2D, the camera includes an imaging lens 3 and an imaging chip 1 that intermittently senses incoming light. The camera further includes an extended light source comprising a distributed illuminator 42 situated near the imaging chip 1 and a duplicate lens 3. The distributed illuminator 42 is capable of being intermittently activated when imaging chip 1 does not need to sense incoming light (e.g., the pixels in the imager have collected enough light for a current frame) such that the projection of the distributed illuminator 42 through the duplicate lens 3 matches the field of view of the imaging chip 1. Since there are two lenses in this arrangement, the illuminator could also be activated simultaneously with the imager (but at a much brighter than normal level) to function as a flash for taking a snapshot Each of the exemplary configurations of FIGS. 2A-2D can include an optical filter 4 for patterning the projected photon (e.g., light) as exemplarily shown in FIG. 4. That is, generally the pupil of the user's eye will only intercept a small portion of the projected pattern. Thus, the perception can just be of a bright light emanating from the camera's lens. However, with a patterned projection using the optical filter 4, it is possible to generate different colors at different offsets from the centerline of the camera. This could be used, for instance, as a centering guide for taking group "selfies". All members of the group should jockey around until the camera appears to be emitting a green light. This then guarantees that their eyes will appear in the portion of the final image corresponding to the rectangle 303 in the projected pattern.

That is, the optical filter can create different colors 301, 302, and 303 as shown in FIG. 4 such that the user(s) can arrange themselves in different portions of the captured image such as the center point of the image seeing the color 303 and surrounding people only seeing color 301 indicating they are still in the image but at the outer portion of the image. This effect is similar to a user watching the screen of a device and arranging the user's accordingly but without the need.

The position of the user(s) can be with respect to the camera or an absolute world position (e.g., via Global Positioning System (GPS)) in the case of a moving camera. It is noted that multiple individually colored light sources can be used.

As shown in FIG. 3 the exposure time required by the imager could also be used to regulate the brightness of the projector. In small form factor scenarios, an independent projector with optics similar to a camera be used. The projector could double up as a pattern projector to optimize illumination for capturing pictures as shown in FIG. 3. Thus, the projector can enable the projected photons to be seen based on a brightness of the environment. For example, in dim environments, the imager needs a longer exposure to develop a proper picture (e.g., just like a film camera). However, fortuitously, in dim environments the projected light does not to be very bright in order to be perceived. Thus, if the two elements are time-sharing the optics, the light can be blinked on for a shorter interval. Since this is happening typically 30 times a second (or faster) the human simply sees a dimmer (but steady) light.

The configurations of the embodiments of FIGS. 2A-2D enable the user to determine if the user is within the camera field of view despite large offsets from the imaging device. For surveillance, the user is only being imaged when he can see light from the camera. This allows the user to shift his position, if desired, so as to remain unmonitored.

The method 100 controls the operation of the configurations of the embodiments of FIGS. 2A-2D including the light sensor 1, imaging optics 3, the extended light source situated near the light sensor 1 and sharing the imaging optics 3, and an optical filter 4.

Step 101 senses incoming light via the imaging optics 3 and the light sensor 1.

Step 102 intermittently activates the extended light source (2a/2b, 22a/22b, 32, 42) when the light sensor 1 does not need to sense incoming light (e.g., the pixels in the imager have collected enough light for a current frame) such that the projection of the extended light source (2a/2b, 22a/22b, 32, 42) through the imaging optics 3 matches a field of view of the light sensor 1.

Step 103 patterns the projection of the extended light source (2a/2b, 22a/22b, 32, 42) via the optical filter 4. That is, Step 103 can filter sections of the field of view with different colors 301, 302, 303, for example, as shown in FIG. 3 such that the users who see the different colors 301, 302, and 303 can know their position in the picture. It is noted that Step 103 can also query the user to adjust the number of people in the picture or change the number of zones e.g., 301, 302, 303) of the picture. It is further noted that the extended light source 2 can generate near monochromatic light or be patterned. That is, the extended light source 2 could be composed of a number of red, yellow, d gem LEDs. These do not emit white light that needs to be spectrally filter and instead they are intrinsically one color. Thereby, the extended light source 2 can act as the optical filter 4 (as described later). Also, a uniform glow can be utilized instead of a spatially differentiated pattern. It is further noted that extended light source 2 can itself be patterned through the use of multiple individually colored lighting elements.

Step 104 adjusts a timing of the projection of the extended light source (2a/2b, 22a/22b, 32, 42) based on a brightness of an environment in which the picture (video) is being taken.

Therefore, the inventors have realized at least one non-abstract technical solution to the technical problem to improve a computer-technology (e.g., a performance of a camera) as exemplary described in the embodiments above by including a projector in addition to the image sensor in the camera with the optics of the projector and sensor are substantially the same so that the projector and sensor imaging cones are identical such that, if a user can see the light from the projector, their eye falls within the field of view of the camera and they can thus determine that the camera is accurately positioned while taking a picture (e.g., a selfie).

Also, although the embodiment herein refer generally to an image being taken, the invention is not limited thereto. The invention can be utilized in a video capture context with each frame of the video corresponding to an image being taken. That is, the invention can provide a way for notifying people when they are under video surveillance from cameras that they are not necessarily aware of (e.g., street cameras, hidden cameras, etc.).

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 5, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the camera field indicating method 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A camera comprising:
   imaging optics;
   a light sensor, the imaging optics and the light sensor intermittently sensing incoming light; and
   an extended light source provided separate from the imaging optics and the light sensor, the extended light source comprising a distributed illuminator capable of being intermittently activated when the light sensor does not need to sense incoming light such that a projection of the distributed illuminator through a duplicate lens of the extended light source matches a field of view of the light sensor,
   wherein the distributed illuminator is situated near the imaging chip and the duplicate lens,
   wherein the imaging optics includes a first lens, and
   wherein the duplicate lens comprises a duplicate of the first lens as a second lens disposed on the extended light source.

2. The camera of claim 1, wherein the extended light source comprises an optical filter for patterning the projection of the distributed illuminator.

3. The camera of claim 1, wherein the distributed illuminator is activated simultaneously with the imaging optics to function as a flash.

4. A camera field indicating method for a camera including a light sensor, imaging optics, and an extended light source provided separate from the imaging optics and the light sensor, the method comprising:
   sensing incoming light via the imaging optics and the light sensor; and
   intermittently activating the extended light source, which includes a distributed illuminator, when the light sensor does not need to sense incoming light such that a projection of the distributed illuminator through a duplicate lens of the extended light source matches a field of view of the light sensor, wherein the distributed illuminator is situated near the imaging chip and the duplicate lens, wherein the imaging optics includes a first lens, and wherein the duplicate lens comprises a duplicate of the first lens as a second lens disposed on the extended light source.

5. The method of claim 4, wherein the extended light source comprises an optical filter for patterning the projection of the distributed illuminator.

6. The method of claim 4, wherein the distributed illuminator is activated simultaneously with the imaging optics to function as a flash.

7. A camera field indicating system for a camera including a light sensor, imaging optics, and an extended light source provided separate from the imaging optics and the light sensor, said system comprising:
 a processor; and
 a memory, the memory storing instructions to cause the processor to perform:
  sensing incoming light via the imaging optics and the light sensor; and
  intermittently activating the extended light source, which includes a distributed illuminator, when the light sensor does not need to sense incoming light such that a projection of the distributed illuminator through a duplicate lens of the extended light source matches a field of view of the light sensor,
 wherein the distributed illuminator is situated near the imaging chip and the duplicate lens,
 wherein the imaging optics includes a first lens, and
 wherein the duplicate lens comprises a duplicate of the first lens as a second lens disposed on the extended light source.

8. The system of claim 7, wherein the extended light source comprises an optical filter for patterning the projection of the distributed illuminator.

9. The system of claim 7, wherein the distributed illuminator is activated simultaneously with the imaging optics to function as a flash.

* * * * *